(12) United States Patent
Gulaka et al.

(10) Patent No.: US 9,865,059 B2
(45) Date of Patent: Jan. 9, 2018

(54) MEDICAL IMAGE PROCESSING METHOD AND APPARATUS FOR DETERMINING PLANE OF INTEREST

(71) Applicant: SAMSUNG ELECTRONICS CO., LTD., Suwon-si (KR)

(72) Inventors: Praveen Gulaka, Suwon-si (KR); Young-ha Kim, Seoul (KR); Soo-in Cho, Seongnam-si (KR); Jae-moon Jo, Seongnam-si (KR); Yang-lim Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/853,235

(22) Filed: Sep. 14, 2015

(65) Prior Publication Data

US 2016/0125607 A1 May 5, 2016

(30) Foreign Application Priority Data

Nov. 3, 2014 (KR) .......................... 10-2014-0151587

(51) Int. Cl.
*G06T 7/00* (2017.01)
*G06T 7/73* (2017.01)

(52) U.S. Cl.
CPC .............. *G06T 7/0042* (2013.01); *G06T 7/73* (2017.01); *G06T 7/74* (2017.01); *G06T 2207/10081* (2013.01); *G06T 2207/10088* (2013.01); *G06T 2207/10136* (2013.01); *G06T 2207/30016* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 4,836,778 A | * | 6/1989 | Baumrind | A61C 19/045 356/139.03 |
| 6,975,896 B2 | * | 12/2005 | Ehnholm | G01R 33/287 600/414 |
| 8,218,849 B2 | | 7/2012 | Lu et al. | |
| 8,588,519 B2 | | 11/2013 | Liu et al. | |
| 8,620,045 B2 | * | 12/2013 | Adams | A61B 1/24 382/128 |
| 2001/0020127 A1 | | 9/2001 | Oshio et al. | |

(Continued)

FOREIGN PATENT DOCUMENTS

| | | |
|---|---|---|
| JP | 2001-037756 A | 2/2001 |
| KR | 10-1110815 B1 | 2/2012 |

(Continued)

OTHER PUBLICATIONS

Communication dated Sep. 17, 2015 issued by the International Searching Authority in counterpart International Patent Application No. PCT/KR2015/007472.

*Primary Examiner* — Matthew Bella
*Assistant Examiner* — Soo Shin
(74) *Attorney, Agent, or Firm* — Sughrue Mion, PLLC

(57) ABSTRACT

A medical image processing apparatus includes a data acquirer that scans an object with a fiducial marker attached thereto to acquire volume data, and a data processor that estimates a plane of interest, based on a position of the fiducial marker and a position of a landmark in the volume data.

23 Claims, 10 Drawing Sheets

(56) References Cited

U.S. PATENT DOCUMENTS

| | | | |
|---|---|---|---|
| 2008/0137931 A1* | 6/2008 | Drumm | A61B 6/022 382/131 |
| 2010/0067764 A1 | 3/2010 | Lu et al. | |
| 2011/0125009 A1* | 5/2011 | Lang | A61B 5/055 600/425 |
| 2011/0206260 A1 | 8/2011 | Bergmans et al. | |
| 2011/0229005 A1 | 9/2011 | Den Harder et al. | |
| 2011/0305313 A1* | 12/2011 | Sklansky | A61B 6/0414 378/37 |
| 2012/0070074 A1 | 3/2012 | Liu et al. | |
| 2012/0121152 A1 | 5/2012 | Lu et al. | |
| 2012/0232802 A1* | 9/2012 | Haimerl | A61B 5/103 702/19 |
| 2014/0228676 A1* | 8/2014 | Thomson | G06T 7/0012 600/424 |
| 2014/0270433 A1 | 9/2014 | Gulaka et al. | |
| 2014/0371591 A1* | 12/2014 | Jung | A61B 8/0866 600/443 |
| 2016/0000355 A1* | 1/2016 | Soler | A61B 6/02 382/131 |

FOREIGN PATENT DOCUMENTS

| | | |
|---|---|---|
| KR | 10-2013-0072810 A | 7/2013 |
| KR | 10-2014-0114308 A | 9/2014 |

\* cited by examiner

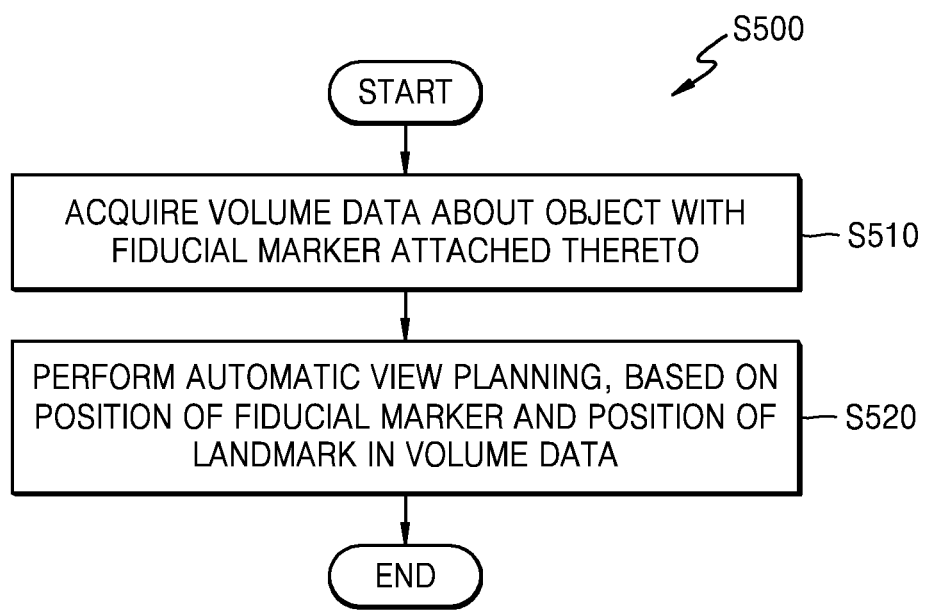

MEDICAL IMAGE PROCESSING METHOD AND APPARATUS FOR DETERMINING PLANE OF INTEREST

CROSS-REFERENCE TO RELATED APPLICATION

This application claims priority from Korean Patent Application No. 10-2014-0151587, filed on Nov. 3, 2014, in the Korean Intellectual Property Office, the disclosure of which is incorporated herein in its entirety by reference.

BACKGROUND

1. Field

Apparatuses and methods consistent with exemplary embodiments relate to a medical image processing apparatus and method, and more particularly, to a medical image processing apparatus and method which enable a plane of interest (POI) to be automatically estimated from volume data.

2. Description of the Related Art

Medical apparatuses, such as ultrasound imaging apparatuses, computed tomography (CT) apparatuses, and magnetic resonance imaging (MRI) apparatuses, may scan an object to generate three-dimensional (3D) volume data. An image of a POI, which is a plane in an object to be examined, is necessary for a medical diagnosis. If a user manually finds a POI, time is consumed, and there is a user-dependent problem. Also, when a user is not skilled, an accuracy of a POI is not high. Further, in many medical applications, a progress of treatment of an object or a progress of a lesion over time needs to be checked. In this case, as time elapses, several medical images are needed to be obtained, for the same POI. However, if a user manually finds a POI, it is not easy to again find the same POI as a previous POI. That is, an accuracy of detection of a POI is reduced, and it takes too much time to detect the POI.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments include a medical image processing apparatus and method which enable a POI to be automatically estimated.

According to an aspect of an exemplary embodiment, a medical image processing apparatus includes: a data acquirer that scans an object with a fiducial marker attached thereto to acquire volume data; and a data processor that estimates a POI, based on a position of the fiducial marker and a position of a landmark in the volume data.

The data processor may detect the position of the fiducial marker and the position of the landmark from the volume data.

The fiducial marker may be displayed at high luminance in the volume data.

The fiducial marker may be displayed at high luminance in a surface of an image of the object of the volume data.

The data processor may detect a mid-sagittal plane from the volume data and detect the position of the landmark from the mid-sagittal plane.

The data processor may detect the position of the landmark from the mid-sagittal plane through machine learning.

The data acquirer may scout-scan the object for acquiring the volume data.

The data acquirer may rescan the object for acquiring an image of interest which is an image of the estimated POI.

The data acquirer may perform the scout scan at a first resolution and perform the rescan at a second resolution higher than the first resolution.

The data processor may acquire an image of interest which is an image of the POI.

The data processor may acquire the image of interest, based on the volume data.

According to an aspect of an exemplary embodiment, a medical image processing method includes: scanning an object with a fiducial marker attached thereto to acquire volume data; and estimating a plane of interest (POI), based on a position of the fiducial marker and a position of a landmark in the volume data.

The medical image processing method may further include detecting the position of the fiducial marker and the position of the landmark from the volume data.

The fiducial marker may be displayed at high luminance in the volume data.

The fiducial marker may be displayed at high luminance in a surface of an image of the object of the volume data.

The detecting of the position of the landmark may include: detecting a mid-sagittal plane from the volume data; and detecting the position of the landmark from the mid-sagittal plane.

The position of the landmark may be detected from the mid-sagittal plane through machine learning.

The medical image processing method may further include scout-scanning the object for acquiring the volume data.

The medical image processing method may further include rescanning the object for acquiring an image of interest which is an image of the estimated POI.

The scout scan may be performed at a first resolution, and the rescan may be performed at a second resolution higher than the first resolution.

The medical image processing method may further include acquiring an image of interest which is an image of the POI.

The image of interest may be acquired based on the volume data.

According to an aspect of an exemplary embodiment, a medical image processing method includes: scanning an object with a fiducial marker attached thereto to acquire first volume data in a first period; estimating a first POI, based on a position of the fiducial marker and a position of a landmark in the first volume data; acquiring a first image of interest (IOI) which is an image of the first POI; scanning the object, in which a fiducial marker is attached to the same position as in the first period, to acquire second volume data in a second period; estimating a second POI which is the same as the first POI, based on a position of the fiducial marker and a position of a landmark in the second volume data; and acquiring a second IOI which is an image of the second POI.

The medical image processing method may further include acquiring information about a difference between the first IOI and the second IOI.

The medical image processing method may further include displaying both the first IOI and the second IOI.

The medical image processing method may further include storing the first IOI.

According to an aspect of an exemplary embodiment, a medical image processing apparatus includes: a data acquirer that scans an object with a fiducial marker attached thereto to acquire first volume data in a first period; a data processor that estimates a first POI, based on a position of the fiducial marker and a position of a landmark in the first volume data and acquires a first image of interest (IOI) which is an image of the first POI; and a storage unit that stores the first IOI.

The data acquirer may scan the object, in which a fiducial marker is attached to the same position as the first period, to acquire second volume data in a second period, and the data processor may estimate a second POI which is the same as the first POI, based on a position of the fiducial marker and a position of a landmark in the second volume data and acquire a second IOI which is an image of the second POI.

The data processor may acquire information about a difference between the second IOI and the first IOI which is stored in the storage unit.

The medical image processing apparatus may further include a display that displays both the second IOI and the first IOI which is stored in the storage unit.

According to an aspect of an exemplary embodiment, a medical image processing apparatus includes: a communicator that receives volume data about an object with a fiducial marker attached thereto; and a data processor that estimates a POI, based on a position of the fiducial marker and a position of a landmark in the volume data.

According to an aspect of an exemplary embodiment, a medical image processing apparatus includes: a data acquirer that acquires volume data about an object with a fiducial marker attached thereto; and a data processor that performs automatic view planning, based on a position of the fiducial marker and a position of a landmark in the volume data.

According to an aspect of an exemplary embodiment, a medical imaging system includes: a medical apparatus that scans an object with a fiducial marker attached thereto to acquire a scan signal; and a medical image processing apparatus that is connected to the medical apparatus, wherein the medical image processing apparatus includes: a data acquirer that acquires volume data based on the scan signal; and a data processor that estimates a POI, based on a position of the fiducial marker and a position of a landmark in the volume data.

The medical apparatus may scout-scan the object to acquire the scan signal.

The medical apparatus may rescan the object to acquire a rescan signal, for acquiring an image of interest which is an image of the POI estimated by the medical image processing apparatus.

The data processor may acquire an image of interest based on the rescan signal, and the medical image processing apparatus may further include an output unit that outputs the image of interest.

BRIEF DESCRIPTION OF THE DRAWINGS

The above and/or other aspects will become more apparent by describing certain exemplary embodiments with reference to the accompanying drawings, in which:

FIG. 16 illustrates a medical image processing method according to an exemplary embodiment.

DETAILED DESCRIPTION

Figure 1:
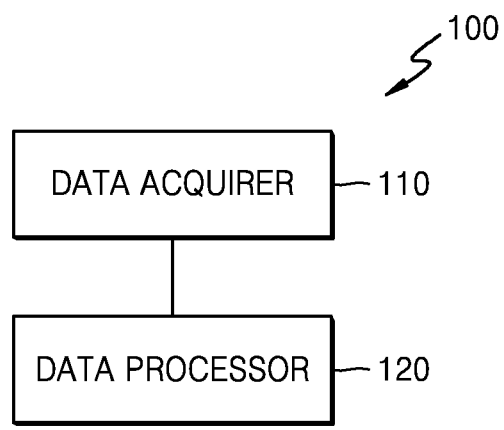
FIG. 1 illustrates a medical image processing apparatus according to an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

In this disclosure, when it is described that one comprises (or includes or has) some elements, it should be understood that it may comprise (or include or has) only those elements, or it may comprise (or include or have) other elements as well as those elements if there is no specific limitation. The term "module", as used herein, means, but is not limited to, a software or hardware component, such as a Field Programmable Gate Array (FPGA) or an Application Specific Integrated Circuit (ASIC), which performs certain tasks. A module may advantageously be configured to reside in the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The term "image" used herein may denote multi-dimensional data composed of discrete image factors (for example, pixels in a two-dimensional (2D) image and pixels in a 3D image). For example, an image may include a medical image of an object which is acquired by an X-ray apparatus, a CT apparatus, an MRI apparatus, an ultrasound apparatus, or another medical imaging apparatus.

Moreover, the term "object" used herein may include a person, an animal, a part of the person, or a part of the animal. For example, an object may include an organ such as a liver, a heart, a womb, a brain, breasts, an abdomen, or the like, or a blood vessel. Also, the term "object" may include a phantom. The phantom denotes a material having a volume very close to a density of organisms and an effective atomic number, and may include a spherical phantom having a temper similar to a human body.

Moreover, the term "user" used herein is a medical expert, and may be a doctor, a nurse, a medical technologist, a medical image expert, or the like, or may be an engineer who repairs a medical apparatus. However, this is not limiting.

FIG. 1 illustrates a medical image processing apparatus 100 according to an exemplary embodiment.

Referring to FIG. 1, the medical image processing apparatus 100 includes a data acquirer 110 and a data processor 120. The medical image processing apparatus 100 may include at least one of an ultrasound imaging apparatus, a CT apparatus, and an MRI apparatus. Alternatively, the medical image processing apparatus 100 may be embodied in or connected to a medical apparatus such as a CT apparatus, an MRI apparatus, an X-ray apparatus, or an ultrasound imaging apparatus.

The data acquirer 110 scans an object with a fiducial marker attached thereto to acquire volume data. The data acquirer 110 may scan an object having a 3D shape and acquire volume data for generating a stereoscopic image of the scanned object. One or more fiducial markers may be attached to an object.

The data acquirer 110 may be implemented depending on a type of the medical image processing apparatus 100. When the medical image processing apparatus 100 is included in or connected to an ultrasound imaging apparatus, the data acquirer 110 may receive and process an ultrasound signal, which is reflected from an object or passes through the object, to acquire volume data. When the medical image processing apparatus 100 is included in or connected to an MRI apparatus, the data acquirer 110 may receive and process an MR signal from an object to acquire volume data.

The data processor 120 estimates one or more POIs, based on at least one of a position of a fiducial marker and a position of a landmark in volume data. That is, the fiducial marker and the landmark become references for estimating the POI.

The position of the fiducial marker may be a position of a voxel corresponding to the fiducial marker in the volume data. The position of the landmark may be a position of a voxel corresponding to the landmark in the volume data. For example, each of the position of the fiducial marker and the position of the landmark may be (x, y, z) coordinates in the volume data. In this case, the fiducial marker may correspond to a plurality of voxels, and the landmark may correspond to a plurality of voxels.

The landmark is a certain point in an object. For example, when the object is a brain, the landmark may be a corpus callosum anterior (CCA) or a corpus callosum posterior (CCP). As another example, when the object is a spine, the landmark may be a vertebra disk posterior (VP). That is, a different landmark may be used depending on an object. Also, one or more landmarks may be used depending on an object. The above-described examples of the landmark are not limiting.

The data processor 120 may detect the position of the fiducial marker and the position of the landmark from the volume data acquired by the data acquirer 110 by performing image processing. The data processor 120 may use luminance information and/or shape information for detecting the position of the fiducial marker and the position of the landmark.

For example, to easily detect a position of a fiducial marker and/or a position of a landmark, the fiducial marker or the landmark may be designated to be easily identifiable in volume data. For example, when the fiducial marker or the landmark has an easily identified shape or has a high luminance difference with a peripheral part, the fiducial marker or the landmark is easily detected. For example, the fiducial marker and the landmark may have a high luminance difference with a peripheral part in volume data. In detail, when a periphery of the landmark is very low in luminance and a luminance of the landmark is very high, the landmark is easily detected from volume data through image processing.

Figure 2:
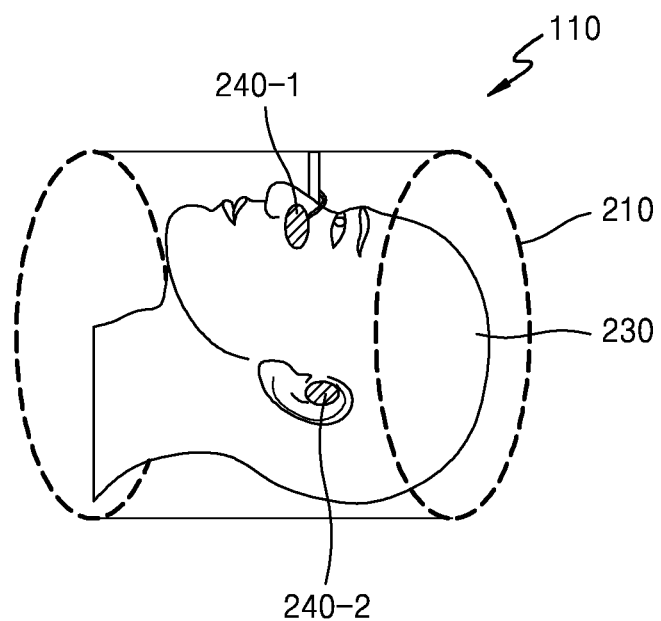
FIG. 2 illustrates an example of a medical image processing apparatus which scans an object with a fiducial marker attached thereto.

FIG. 2 illustrates an example of a medical image processing apparatus 100 which scans an object with a fiducial marker attached thereto.

Referring to FIG. 2, the medical image processing apparatus 100 may include a data acquirer 110. For example, when the medical image processing apparatus 100 is an MRI apparatus, the data acquirer 110 may include a radio frequency (RF) coil 210. The data acquirer 110 may scan an object 230 with a plurality of fiducial markers 240-1 and 240-2 attached thereto to acquire volume data. A fiducial marker may be attached to outer surface of those parts of the object whose positions hardly change in the object despite the lapse of time and which therefore may become references. The fiducial marker may be attached to at least one of the parts which may become a reference on a surface of the object 230.

In FIG. 2, the object 230 is a head of patient, and the fiducial markers 240-1 and 240-2 are respectively attached to a nose and an ear of the patient because a nose and ears are parts whose positions hardly change in the object 230 despite the lapse of time. The fiducial marker 240-1 may be a nose pad, and the fiducial marker 240-2 may be an ear plug. As another example, a fiducial marker may be attached to a philtrum and/or a glabella, whose positions also hardly change in the object 230 despite the lapse of time. In this case, the fiducial marker may be a sticker, but this is not limiting.

In FIG. 2, a head is illustrated, but the object is not limited to the head. That is, the object is not limited, and an appropriate fiducial marker may be attached to a part whose position hardly changes in the object over time and which, thus, may become a reference.

Figure 3:
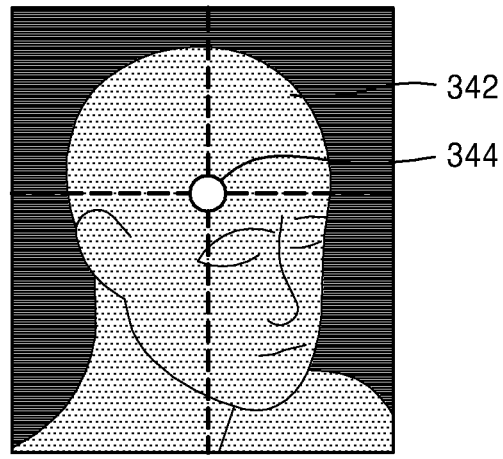
FIG. 3 illustrates an example of an object image for which 3D rendering is performed based on volume data.

FIG. 3 illustrates an example of an object image for which 3D rendering is performed based on volume data. In FIG. 3, an object is a head.

Referring to FIG. 3, in an object image 330, a bright area is a fiducial marker 340. That is, the fiducial marker 340 may be displayed at high luminance in volume data. The fiducial marker 340 may be displayed at higher luminance than a peripheral area 342 of the object adjacent the fiducial marker 340 or another region 344 in the volume data. Alternatively, the fiducial marker 340 may be displayed at higher luminance than a threshold value. Therefore, the data processor 120 easily detects a position of the fiducial marker 340 by using luminance information in the volume data.

For example, when volume data is acquired by an MRI apparatus, a fiducial marker may include an MRI active element having T1 contrast or T2 contrast. When the volume data is acquired by a CT apparatus, the fiducial marker may include a material which is displayed at high luminance in a CT image, so that the fiducial marker is easily detected from the CT image. When the volume data is acquired by an ultrasound apparatus, the fiducial marker may include a material which is displayed at high luminance in an ultrasound image, so that the fiducial marker is easily detected from the ultrasound image. Also, the fiducial marker may include a contrast material such as a contrast agent. A part with an injected contrast agent is shown as highly bright in a medical image which is obtained by imaging an object with the contrast agent by using an MRI apparatus, a CT apparatus, an ultrasound apparatus, or an X-ray apparatus. When the fiducial marker includes a contrast material, a luminance of a region of the fiducial marker is highly bright in the volume data.

Figure 4:
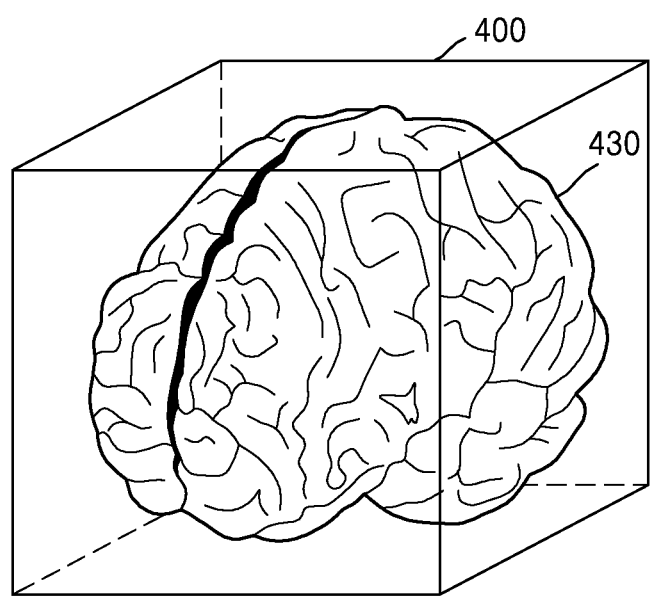
FIG. 4 illustrates an example of volume data.

FIG. 4 illustrates an example of volume data acquired by the data acquirer.

Referring to FIG. 4, the data acquirer 110 scans an object with a fiducial marker attached thereto to acquire volume data 400. The volume data 400 is multi-dimensional data including a plurality of voxels. The volume data 400 includes an object image 430. The data acquirer 110 may scout-scan the object to acquire the volume data 400 having a low resolution, because the volume data 400 is used to estimate a POI and, thus, a high resolution image is not needed. A time taken in acquiring the volume data 400 is shortened due to the scout scan in which a resolution is low.

Figure 5:
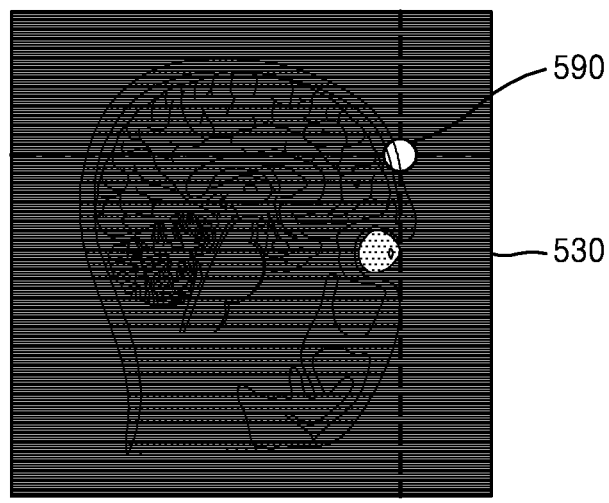
FIG. 5 illustrates an example of a plane image from volume data.

FIG. 5 illustrates an example of a plane image from volume data.

Referring to FIG. 5, a plane image includes an object image 530, and a fiducial marker 590 is clearly shown on a surface of the object image 530. Therefore, a position of the fiducial marker 590 is clearly detected from volume data, and thus, the fiducial marker 590 becomes a reference for estimating a POI.

Figure 6:
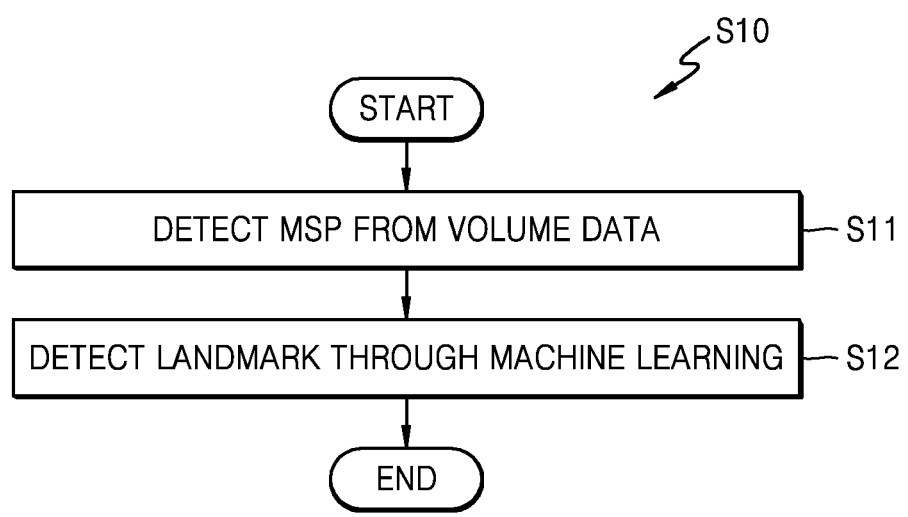
FIG. 6 is a flowchart illustrating an example of a method of detecting a position of a landmark.

FIG. 6 is a flowchart illustrating an example of a method of detecting a position of a landmark. In FIG. 6, a method S10 of detecting a position of a landmark may be performed by the data processor 120.

Referring to FIG. 6, in operation S11, the data processor 120 detects an MSP from volume data. In operation S12, the data processor 120 detects the landmark from the MSP through machine learning.

Figure 7:
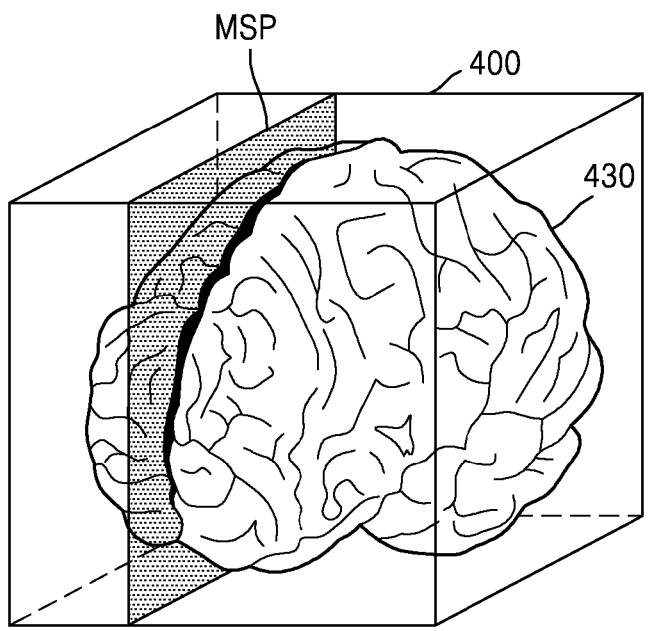
FIG. 7 illustrates a mid-sagittal plane (MSP) detected from the volume data of FIG. 4.

FIG. 7 illustrates an MSP detected from the volume data of FIG. 4.

Referring to FIG. 7, an MSP may be detected from volume data 400. In FIG. 7, the MSP is a plane which divides a brain image 430 into two cerebral hemispheres.

A brain longitudinal fissure may be used to estimate a position of the MSP in the volume data 400. The brain longitudinal fissure may be detected from a plurality of axial plane images and a plurality of coronal plane images. A brain longitudinal fissure line may be a line which is detected as a longest line in each of the plane images. Brain longitudinal fissure lines acquired from the plane images may become references for estimating the MSP. This is merely an example of a method of detecting the MSP, and a method of detecting the MSP from the volume data 400 is not limited thereto.

Referring again to FIG. 6, in the method S10 of detecting a position of a landmark, at least one landmark is detected, through the machine learning, from the MSP detected from the volume data in operation S12.

Figure 8:
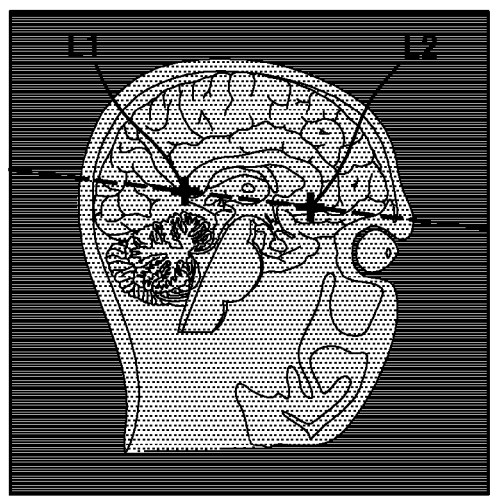
FIG. 8 illustrates a landmark detected from an MSP.

Referring to FIG. 8, a plurality of landmarks L1 and L2 may be detected from an MSP. For example, the landmarks L1 and L2 may be disposed at a corpus callosum posterior (CCP) and a corpus callosum anterior (CCA), respectively, but this is not limiting. A landmark detecting operation may localize a position of a landmark in volume data. A position of a landmark may be detected from volume data through various mathematical and statistical methods and medical image processing. As described above, a position of a landmark in volume data may be detected based on a luminance difference with a peripheral part of the landmark or a shape of the landmark.

In FIGS. 6 to 8, an example of a method in which the data processor 120 determines a position of a landmark has been described above, but the present exemplary embodiment is not limited thereto. A position of a landmark may be detected from volume data by various appropriate methods.

As described above, the data processor 120 may detect a position of a fiducial marker and a position of a landmark in volume data. The fiducial marker may have higher luminance than a peripheral part of the fiducial marker or another region in a surface of an object in the volume data. Alternatively, the fiducial marker may be displayed at higher luminance than a threshold value. Since the fiducial marker has high luminance in the surface of the object in the volume data, the fiducial marker is easily detected.

When the position of the fiducial marker and the position of the landmark are detected from the volume data, the data processor 120 may estimate a POI, based on the position of the fiducial marker and the position of the landmark in the volume data. Since there are reference points (i.e., the fiducial marker and the landmark) in the volume data, the POI may be estimated in the volume data, based on the reference points. Therefore, the data processor 120 may acquire an image of interest (IOI) which is an image of the estimated POI.

The data processor 120 may perform automatic view planning (AVP), based on the position of the fiducial marker and the position of the landmark in the volume data. View planning is an operation that determines planes in volume data of a medical image and, planes, i.e., views, may be determined through the AVP. The planes may be determined according to a positional relationship with the reference points, based on the positions of the fiducial marker and the landmark which are the reference points in the volume data. For example, reference planes such as an MSP, an axial plane, and a coronal plane may be determined through the AVP. In this case, the POI may be at least one of the planes which are determined through the AVP. Alternatively, the POI may be estimated by using a positional relationship with the reference planes, based on the reference planes such as the MSP, the axial plane, and the coronal plane.

Hereinafter, a method of acquiring an IOI will be described in detail.

As described above, a scan of an object for acquiring volume data may be a scout scan. In this case, the data acquirer 110 may rescan the object, for acquiring an IOI which is an image of an estimated POI. A resolution of the rescan may be higher than that of the scout scan. Also, in the scout scan, the object may be wholly scanned for acquiring the volume data. On the other hand, in the rescan, only a portion of the object corresponding to the POI may be scanned. In the scout scan, by lowering a resolution, a scan time is prevented from increasing. In the rescan, by reducing a scanned portion, a scan time is prevented from increasing.

Alternatively, the IOI may be acquired from the volume data. For example, when a resolution of the volume data is appropriate, the object is not rescanned for acquiring the IOI.

Whether to rescan the object for acquiring the IOI may be determined based on a scan time for acquiring the volume data and a resolution of the volume data.

Figure 9:
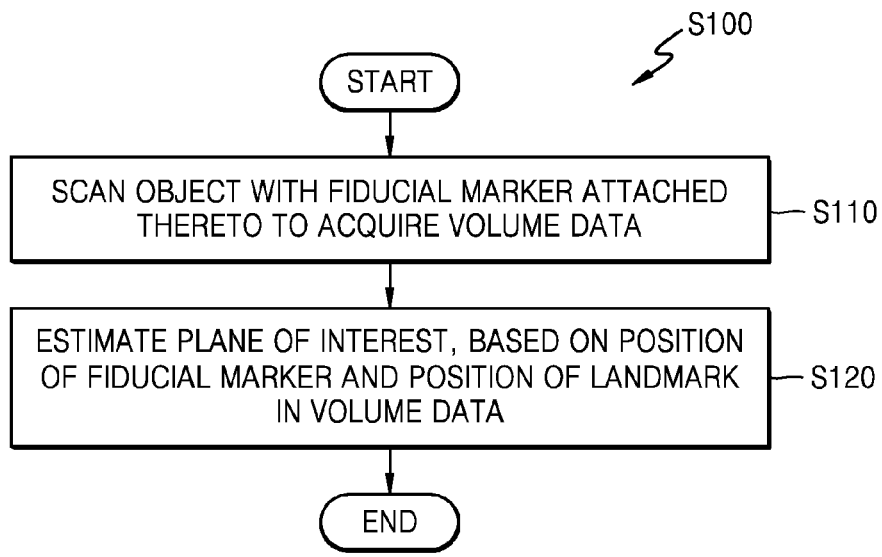
FIG. 9 illustrates a medical image processing method according to an exemplary embodiment.

FIG. 9 illustrates a medical image processing method according to an exemplary embodiment. A medical image processing method S100 of FIG. 9 may be performed by the medical image processing apparatus 100 described above with reference to FIGS. 1-8, and, thus, detailed descriptions are not repeated.

Referring to FIG. 9, in operation S110, the medical image processing apparatus scans an object with a fiducial marker attached thereto to acquire volume data. In operation S120, the medical image processing apparatus estimates a POI, based on a position of the fiducial marker and a position of a landmark in the volume data.

Figure 10:
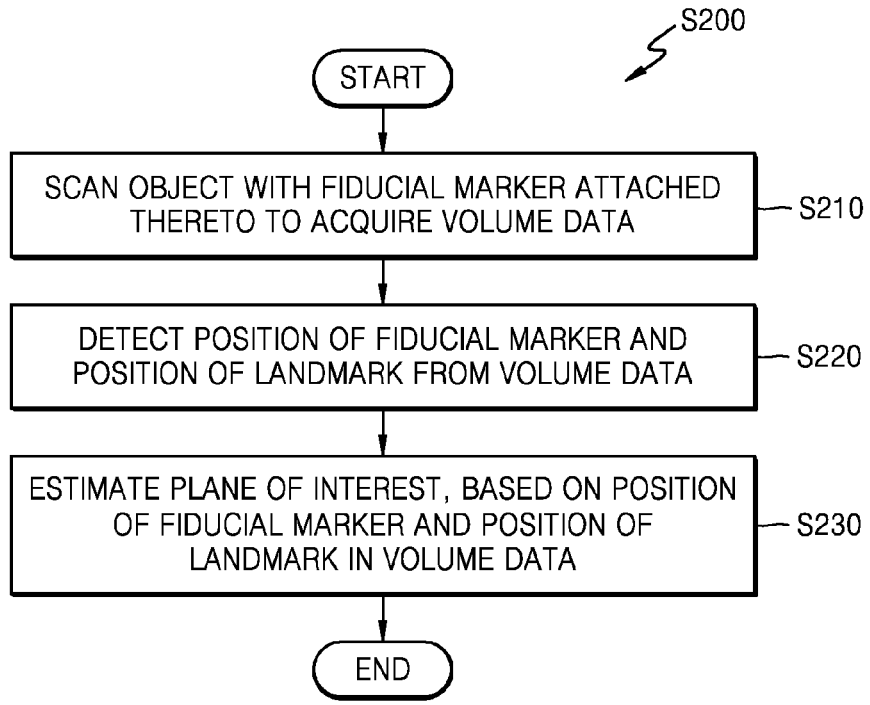
FIG. 10 illustrates a medical image processing method according to an exemplary embodiment.

FIG. 10 illustrates a medical image processing method according to an exemplary embodiment. A medical image processing method S200 of FIG. 10 may be performed by the medical image processing apparatus 100 described above with reference to FIGS. 1-8, and, thus, detailed descriptions are not repeated.

Referring to FIG. 10, in operation S210, the medical image processing apparatus scans an object with a fiducial marker attached thereto to acquire volume data. In operation S220, the medical image processing apparatus detects a position of the fiducial marker and a position of a landmark from the volume data. In operation S230, the medical image processing apparatus estimates a POI, based on the position of the fiducial marker and the position of the landmark in the volume data.

Figure 11:
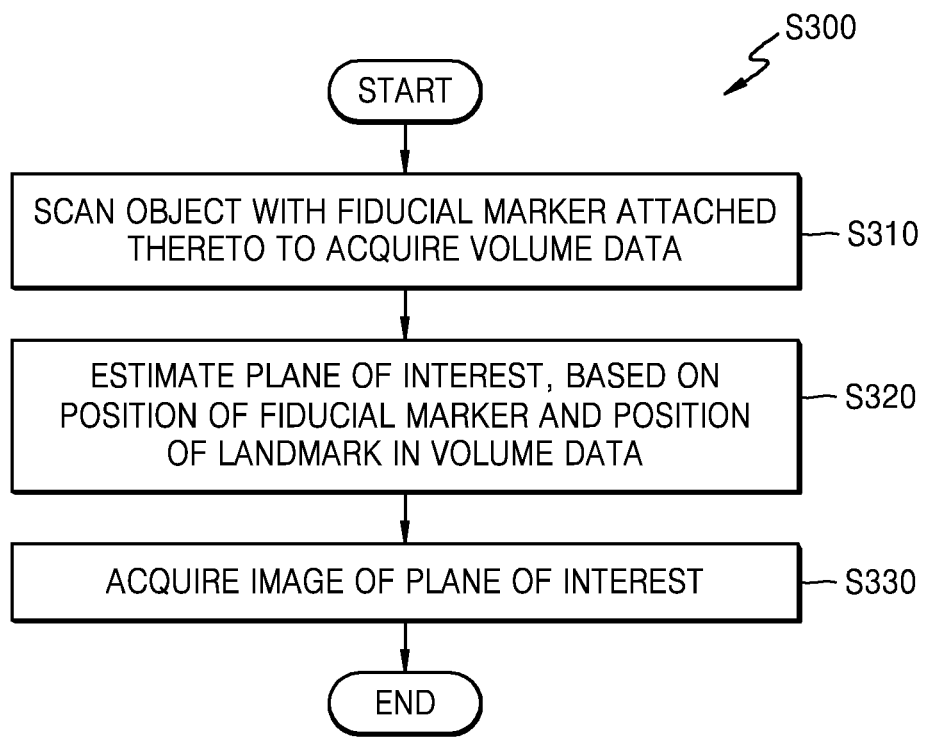
FIG. 11 illustrates a medical image processing method according to an exemplary embodiment.

FIG. 11 illustrates a medical image processing method according to an exemplary embodiment. A medical image processing method S300 of FIG. 11 may be performed by the medical image processing apparatus 100 described above with reference to FIGS. 1-8, and, thus, detailed descriptions are not repeated.

Referring to FIG. 11, in operation S310, the medical image processing apparatus scans an object with a fiducial marker attached thereto to acquire volume data. In operation S320, the medical image processing apparatus estimates a POI, based on a position of the fiducial marker and a position of a landmark in the volume data. In operation S330, the medical image processing apparatus acquires an IOI which is an image of the POI.

According to an exemplary embodiment, both a fiducial marker and a landmark are used for estimating a POI. The fiducial marker may be attached to a certain part which is not easily changed in an object, and thus become a robust reference point for estimating the POI. Also, the fiducial marker is displayed at high luminance in volume data, and a position of the fiducial marker is easily detected. That is, a complicated image processing operation is not needed for detecting the position of the fiducial marker. Therefore, although the complicated image processing operation is not added, an accuracy of estimation of the POI increases.

In order to check a progress of treatment or a progress of a lesion, a first medical image may be acquired by scanning an object, and then, a second medical image may be acquired by scanning the object again. The first medical image and the second medical image may be the same plane images, because a progress of treatment or a progress of a lesion is accurately diagnosed by comparing the same plane images. According to an exemplary embodiment, even when an object is scanned again after time elapses, the substantially same POI is acquired.

Hereinafter, a method of acquiring the same plane image after time elapses, according to an exemplary embodiment, will be described.

Figure 12:
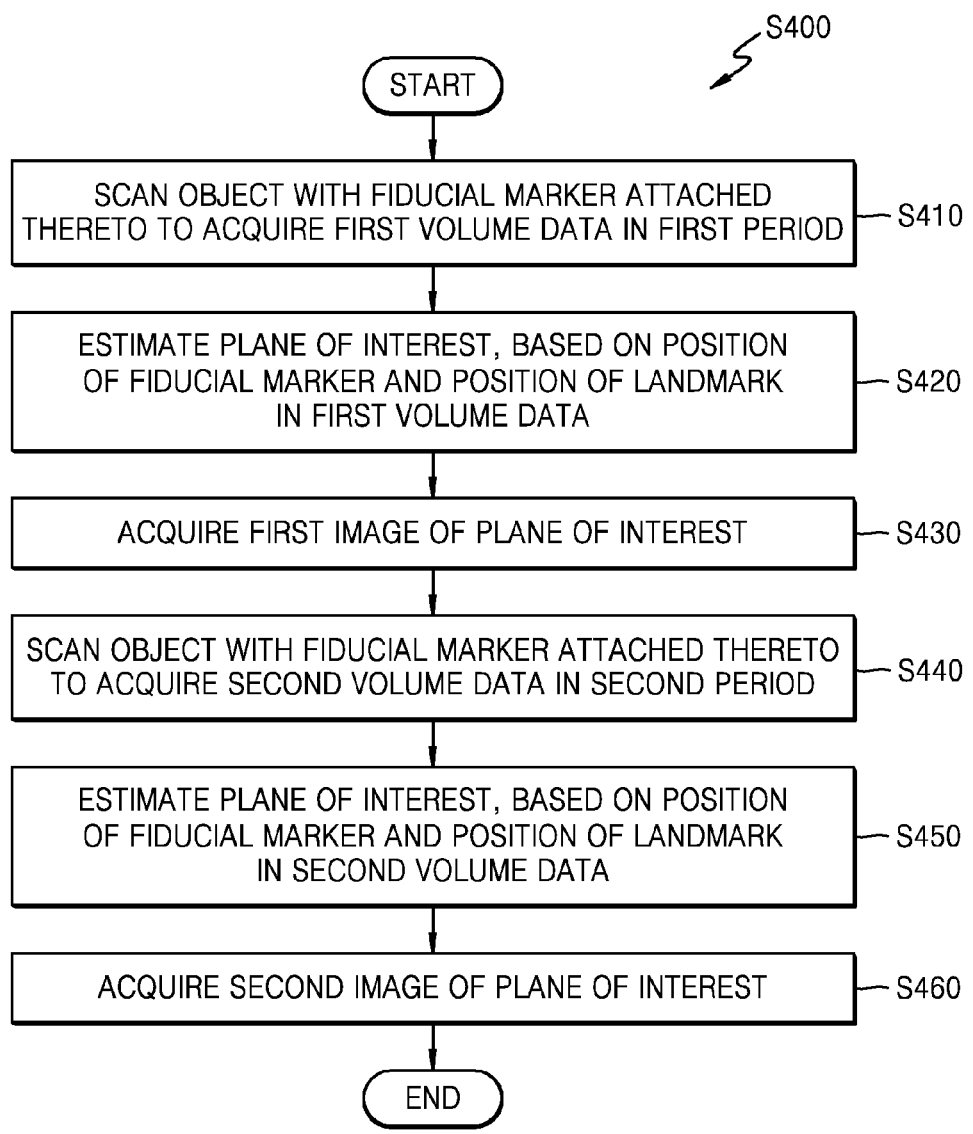
FIG. 12 illustrates a medical image processing method according to an exemplary embodiment.

FIG. 12 illustrates a medical image processing method according to an exemplary embodiment. A medical image processing method S400 of FIG. 12 may be performed by the medical image processing apparatus 100 described above with reference to FIGS. 1-8, and, thus, detailed descriptions are not repeated.

Referring to FIG. 12, in operation S410, the medical image processing apparatus scans an object with a fiducial marker attached thereto to acquire first volume data in a first period. In operation S420, the medical image processing apparatus estimates a first POI, based on a position of the fiducial marker and a position of a landmark in the first volume data. In operation S430, the medical image processing apparatus acquires a first IOI which is an image of the first POI. In operation S440, the medical image processing apparatus scans the object, in which a fiducial marker is attached to the same position as the first period, to acquire second volume data in a second period. In operation S450, the medical image processing apparatus acquires a second IOI which is an image of a second POI. For example, the first period may denote a time when a patient which is an object is initially imaged during a visit to a hospital. The second period may denote a time when the object is subsequently imaged after a certain time (for example, a week, a month, etc.) elapses from the first period.

In operation S450, the medical image processing apparatus estimates the second POI which is substantially the same as the first POI, based on a position of a fiducial marker and a position of a landmark in the second volume data. The position of the fiducial marker in the second volume data is substantially the same as that of the first volume data. This is because the fiducial marker in the second period is attached to the same position as the first period of the object. When the position of the fiducial marker of the second volume data is the same as that of the first volume data, it is possible to estimate the second POI that is substantially the same as the first POI. This is because estimation of the second POI may use a positional relationship between the fiducial marker and a POI in the first volume data. If a plurality of fiducial markers is used, a more accurate positional relationship between a fiducial marker and a POI is acquired.

Moreover, according to an exemplary embodiment, even when a landmark is changed with the lapse of time, the same POI as a previous POI can be estimated. This is because a position of a fiducial marker becomes a reference point which is not changed despite the lapse of time. A position of the landmark corresponds to an anatomical position of an object and thus may be changed with the lapse of time. For example, when the landmark is a tumor, the tumor may be enlarged or reduced with the lapse of time. Therefore, if the same POI is estimated by using only the position of the landmark without the fiducial marker after time elapses, there is a possibility that it is unable to estimate the same POI as a previous POI. In this case, a progress of a state of an object is not accurately diagnosed.

As described above, since the first IOI and the second IOI are images of the same POI, the first IOI and the second IOI helps to accurately diagnose a progress of a state of an object.

Figure 13:
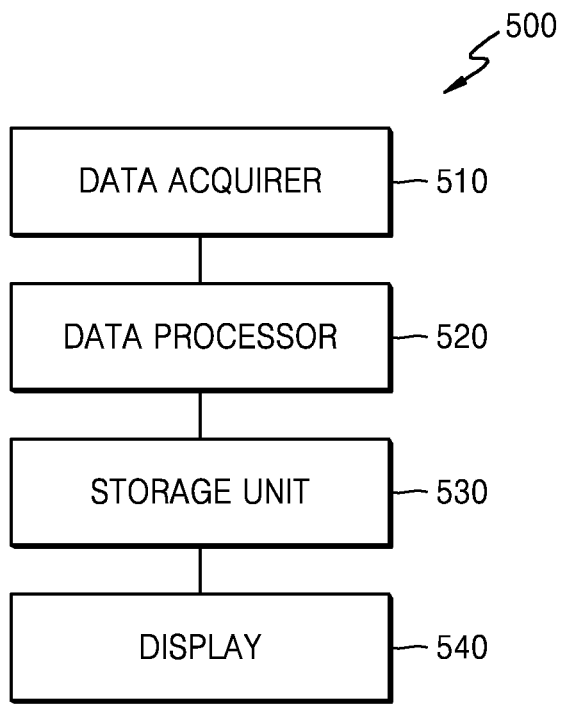
FIG. 13 illustrates a medical image processing apparatus according to an exemplary embodiment.

FIG. 13 illustrates a medical image processing apparatus 500 according to an exemplary embodiment.

Referring to FIG. 13, the medical image processing apparatus 500 includes a data acquirer 510, a data processor 520, a storage unit 530, and a display 540. The data acquirer 510 and the data processor 520 respectively correspond to the data acquirer 110 and data processor 120 of FIG. 1, and thus, a repetitive description is not provided.

The data acquirer 510 scans an object with a fiducial marker attached thereto to acquire first volume data in a first period. The data processor 520 estimates a first POI, based on a position of the fiducial marker and a position of a landmark in the first volume data and acquires a first IOI which is an image of the first POI.

The storage unit 530 may store the first IOI.

The data acquirer 510 may scan the object, in which a fiducial marker is attached to the same position as the first period, to acquire second volume data in a second period where a certain time elapses from the first period. The data processor 520 may estimate the same second POI as the first POI, based on a position of the fiducial marker and a position of a landmark in the second volume data and acquire a second IOI which is an image of the second POI.

The data processor 520 may acquire information, which is information about a difference between the first IOI and the second IOI, through image processing. Difference information between two IOIs is used for diagnosing a progress of a state of an object.

The display 540 may display both the first IOI and the second IOI. In this case, a user easily compares the first IOI and the second IOI. Therefore, the user accurately diagnoses a progress of a state of an object with the lapse of time.

Figure 14:
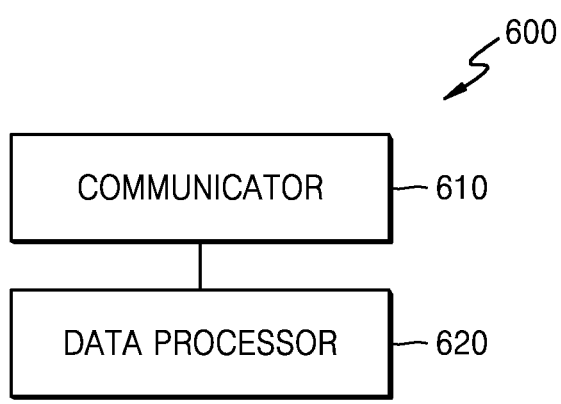
FIG. 14 illustrates a medical image processing apparatus according to an exemplary embodiment.

FIG. 14 illustrates a medical image processing apparatus 600 according to an exemplary embodiment.

Referring to FIG. 14, the medical image processing apparatus 600 includes a communicator 610 and a data processor 620. The communicator 610 may receive volume data from an external apparatus of the medical image processing apparatus 600. The external apparatus may be an external server, an external medical apparatus, or an external portable terminal. The volume data may be acquired from the external apparatus. The volume data may be acquired by scanning an object with a fiducial marker attached thereto.

The data processor 620 estimates a POI, based on a position of a fiducial marker and a position of a landmark in the volume data received by the communicator 610. The data processor 620 corresponds to the data processor 120 of FIG. 1, and the above-described details for estimating a POI may be all applied to the data processor 620.

As described above, the medical image processing apparatus 600 may be an apparatus that does not directly scan an object but receives volume data from another apparatus, which scans an object, to process the volume data.

The communicator 610 may exchange data with a hospital server or another medical device in a hospital that is connected with a picture archiving and communications system (PACS). The communicator 610 may perform data communication according to the digital imaging and communications in medicine (DICOM) standard.

The communicator 610 may be connected to a network via wires or wirelessly to communicate with an external server, an external medical apparatus, or an external portable terminal.

In detail, the communicator 610 may transmit or receive data relating to diagnosis of the object via the network, and may transmit or receive medical images captured by another medical apparatus, for example, a CT, an MRI, an X-ray apparatus, or an ultrasound apparatus. Moreover, the communicator 610 may receive medical history or treatment schedule of an object (e.g., a patient) from a server to diagnose the object. Also, the communicator 610 may perform data communication with a portable terminal such as a mobile phone of a doctor or a patient, a personal digital assistant (PDA), or a laptop computer, as well as a server or a medical apparatus in a hospital.

The communicator 610 may include one or more elements enabling to communicate with external apparatuses, for example, a short distance communication module, a wired communication module, and a wireless communication module.

The short distance communication module is a module for communicating with a device located within a predetermined distance. The short distance communication technology may be wireless local area network (LAN), Wi-Fi, Bluetooth, Zigbee, Wi-Fi Direct (WFD), ultra wideband (UWD), infrared data association (IrDA), Bluetooth low energy (BLE), near field communication (NFC), or the like; however, exemplary embodiments are not limited thereto.

The wired communication module is a module for communicating by using an electric signal or an optical signal, and the wired communication technology may be wired communication technology using a pair cable, a coaxial cable, or an optical fiber cable, and a wired communication technology known to those skilled in the art.

The wireless communication module may transmit and/or receive a wireless signal to and/or from at least one of a base station, an external device, and a server in a mobile communication network. The wireless signal may be a voice call signal, a video call signal, or various types of data according to text and/or multimedia messages transmission.

Figure 15:
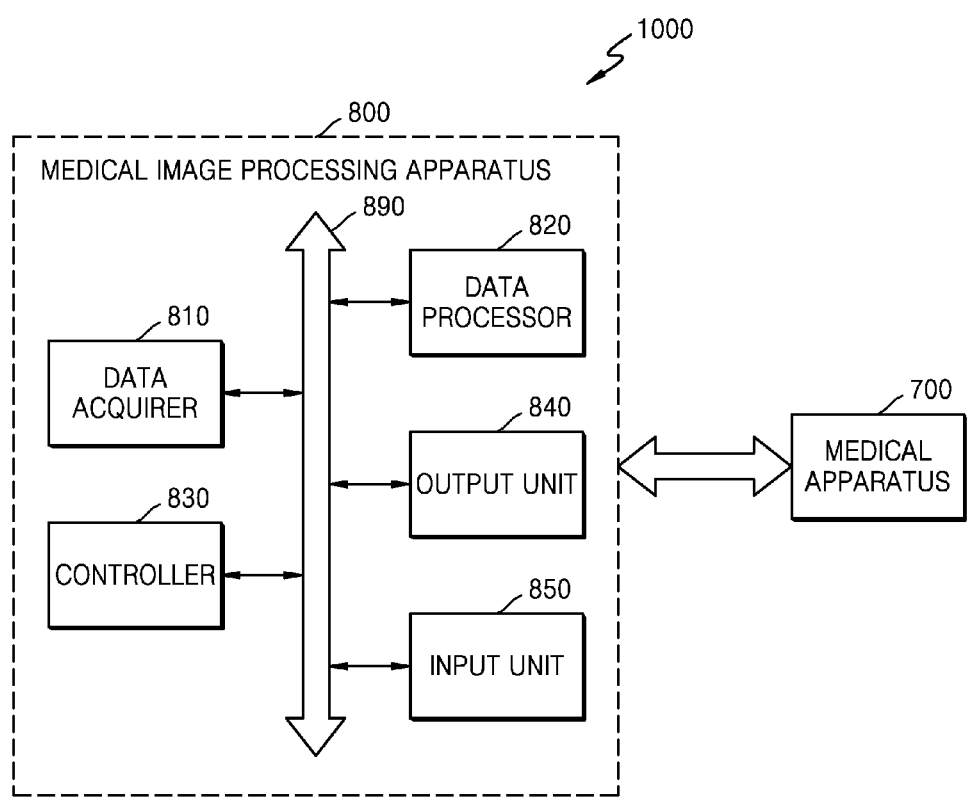
FIG. 15 illustrates a medical imaging system according to an exemplary embodiment.

FIG. 15 illustrates a medical imaging system 1000 according to an exemplary embodiment.

Referring to FIG. 15, the medical imaging system 1000 may include a medical apparatus 700 and a medical image processing apparatus 800.

The medical apparatus 700 may include a CT apparatus, an MRI apparatus, an ultrasound apparatus, and/or an X-ray apparatus.

The medical image processing apparatus 800 may be connected to the medical apparatus 700 by wire or wirelessly. Each of the medical image processing apparatus 800 and the medical apparatus 700 may include a communicator (not shown) for communication therebetween.

The medical image processing apparatus 800 may be provided in a space which is physically separated from the medical apparatus 700. The medical apparatus 700 may be provided in a shield room, and the medical image processing apparatus 800 may be provided in a console room. The shield room may denote a space in which the medical apparatus 700 is provided to image an object, and may be referred to as an imaging room or an examination room. The console room is a space in which a user is located for controlling the medical apparatus 700, and denotes a space separated from the shield room. The console room and the shield room may be separated from each other by a shielding wall to protect a user from a magnetic field, radiation, or an RF signal transferred from the shield room.

The medical image processing apparatus 800 may include a data acquirer 810, a data processor 820, a controller 830, an output unit 840, and an input unit 850. Various elements included in the medical image processing apparatus 800 may be connected to each other through a bus 890.

The above-described with reference to exemplary embodiments of FIGS. 1-14 may be applied to the data acquirer 810 and the data processor 820 and, thus, repeated descriptions are omitted.

The output unit 840 and the input unit 850 may provide a user with a user interface (UI) for controlling and manipulating the medical image processing apparatus 800 and the medical apparatus 700. The output unit 840 may output the UI. The output unit 840 may include, for example, a speaker, a printer, a cathode ray tube (CRT) display, a liquid crystal display (LCD), a plasma display panel (PDP), an organic light emitting diode (OLED) display, a field emission display (FED), an LED display, a vacuum fluorescent display (VFD), a digital light processing (DLP) display, a flat panel display (FPD), a 3D display, or a transparent display, and may include other various appropriate output devices.

The input unit 850 may receive, from the user, a command for manipulating the medical image processing apparatus 800 and the medical apparatus 700. The input unit 850 may include, for example, a keyboard, a mouse, a touch screen, a voice recognizer, a fingerprint recognizer, an iris recognizer, and the like.

The controller 830 may control operations of the medical image processing apparatus 800 and the medical apparatus 700. Therefore, the medical apparatus 700 may be controlled through the medical image processing apparatus 800. Thus, the user may control the medical apparatus 700 through the medical image processing apparatus 800, for example, remotely.

The medical apparatus 700 may scan an object with a fiducial marker attached thereto to acquire a scan signal. For example, when the medical apparatus 700 is an ultrasound apparatus, the scan signal may be an ultrasound signal which passes through the object or is reflected from the object. When the medical apparatus 700 is an MRI apparatus, the scan signal may be an RF signal which is emitted from the object. When the medical apparatus 700 is a CT apparatus or an X-ray apparatus, the scan signal may be an electrical signal which is generated by detecting an X-ray passing through the object.

The medical apparatus 700 may acquire volume data, based on the scan signal. Alternatively, the medical apparatus 700 may transfer the scan signal to the medical image processing apparatus 800.

The data acquirer 810 may receive the scan signal or the volume data acquired by the medical apparatus 700. When the data acquirer 810 receives the scan signal, the data acquirer 810 may acquire the volume data, based on the scan signal.

The data processor 820 may estimate a POI, based on a position of the fiducial marker and a position of a landmark in the volume data acquired by the data acquirer 810. The data processor 820 corresponds to the data processor 120 of FIG. 1, and the above-described details for estimating a POI may be applied to the data processor 820.

The medical apparatus 700 may scout-scan an object to acquire a scan signal. That is, volume data for estimating a POI may be acquired by scout-scanning the object. Also, the medical apparatus 700 may rescan the object for acquiring an IOI which is an image of the POI estimated by the medical image processing apparatus 800. In this case, a resolution of the rescan may be higher than that of the scout scan.

The medical apparatus 700 may rescan the object to acquire a rescan signal and acquire the IOI, based on the rescan signal. Also, the medical apparatus 700 may transfer the acquired IOI to the medical image processing apparatus 800.

Alternatively, the medical apparatus 700 may transfer the rescan signal, which is acquired by rescanning the object, to the medical image processing apparatus 800. The data acquirer 810 of the medical image processing apparatus 800 may acquire the rescan signal. The data processor 820 may acquire the IOI, based on the rescan signal.

The output unit 840 may display the IOI.

FIG. 16 illustrates an example of a medical image processing method according to an exemplary embodiment. A medical image processing method S500 of FIG. 16 may be performed by the medical image processing apparatus 100 of FIG. 1, the medical image processing apparatus 500 of FIG. 13, the medical image processing apparatus 600 of FIG. 14, or a medical imaging system 1000 of FIG. 15.

Referring to FIG. 16, in operation S510, volume data about an object with a fiducial marker attached thereto is acquired. In operation S520, AVP is performed based on a position of the fiducial marker and a position of a landmark in the volume data. A POI may be estimated based on planes determined by the AVP. The above-described with reference to exemplary embodiments of FIGS. 1-15 may be applied here and, thus, repeated descriptions are omitted The above-described exemplary embodiments may be written as computer programs and may be implemented in computers that execute the programs using a computer-readable recording medium.

Examples of the computer-readable recording medium include magnetic storage media (e.g., ROM, floppy disks, hard disks, etc.) and optical recording media (e.g., CD-ROMs, or DVDs).

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A medical image processing method comprising:
   scanning an object which has a first attachable marker attached to a surface of the object and a landmark disposed within the object, to acquire first volume data in a first period;
   estimating a first plane of interest (POI), based on a position of the first attachable marker and a position of the landmark in the first volume data;
   acquiring a first image of interest (IOI) which is an image of the first POI;
   scanning the object, with a second attachable marker attached to a same position as that of the first attachable marker in a scan in the first period, to acquire second volume data in a second period;
   estimating a second POI which is a same POI as the first POI, based on a position of the second attachable marker, a position of the landmark in the second volume data, and a positional relationship between the first attachable marker and the first POI; and
   acquiring a second IOI which is an image of the second POI.

2. A non-transitory computer-readable storage medium storing a computer program which, when executed by a computer, causes the computer to execute the medical image processing method of claim 1.

3. The medical image processing method of claim 1, further comprising:
   acquiring information about a difference between the first IOI and the second IOI.

4. The medical image processing method of claim 3, further comprising:
   displaying the first IOI and the second IOI together on a display.

5. The medical image processing method of claim 1, further comprising storing the first IOI.

6. The medical image processing method of claim 1, wherein the medical image processing method is performed by a magnetic resonance imaging (MRI) apparatus.

7. A medical image processing apparatus comprising:
a processor configured to obtain first volume data in a first period acquired by scanning an object, which has a first attachable marker attached to a surface of the object and a landmark disposed within the object,
to estimate a first plane of interest (POI), based on a position of the first attachable marker and a position of the landmark in the first volume data, and to acquire a first image of interest (IOI) which is an image of the first POI; and
a storage unit which is coupled to the processor and stores the first IOI,
wherein, in a second time period, the processor obtains second volume data acquired by scanning the object with a second attachable marker attached to a same position as that of the first attachable marker in a scan in the first period, estimates a second POI which is a same POI as the first POI, based on a position of the second attachable marker, a position of the landmark in the second volume data, and a positional relationship between the first attachable marker and the first POI, and acquires a second IOI which is an image of the second POI.

8. The medical image processing apparatus of claim 7, wherein the processor is configured to acquire information about a difference between the second IOI and the first IOI which has been stored in the storage unit.

9. The medical image processing apparatus of claim 6, further comprising:
a display configured to display together the second IOI and the first IOI,
wherein the first IOI is retrieved from the storage unit.

10. The medical image processing apparatus of claim 7, wherein the medical image processing apparatus is a magnetic resonance imaging (MRI) apparatus.

11. The medical image processing apparatus of claim 7, wherein the first attachable marker and the second attachable marker are attached to at least one among a nose, an ear, and a philtrum of the object.

12. A medical image processing apparatus comprising:
a communication interface which is coupled to a processor and receives volume data about an object having an attachable marker attached to a surface of the object and a landmark disposed within the object; and
a data processor configured to detect, in the volume data, a position of the attachable marker, to detect a midsagittal plane (MSP), to detect a position of the landmark from the detected MSP, and to estimate a plane of interest (POI) in the object, based on the detected position of the attachable marker and the detected position of the landmark.

13. The medical image processing apparatus of claim 12, wherein the medical image processing apparatus is a magnetic resonance imaging (MRI) apparatus.

14. The medical imaging processing apparatus of claim 12, wherein the attachable marker is attached to at least one among a nose, an ear, and a philtrum of the object.

15. A medical image processing apparatus comprising:
a processor configured to obtain first volume data in a first period acquired by scanning an object having a first attachable marker attached to a surface of the object and a landmark disposed within the object, to obtain second volume data in a second time period acquired by scanning the object having a second attachable marker attached to a same position as that of the first attachable marker in a scan in the first period,
to estimate a first plane of interest (POI), based on a position of the first attachable marker and a position of the landmark in the first volume data, and to perform automatic view planning, based on a position of the second attachable marker, a position of the landmark in the second volume data, and a positional relationship between the first attachable marker and the first POI.

16. The medical image processing apparatus of claim 15, wherein the medical image processing apparatus is a magnetic resonance imaging (MRI) apparatus.

17. The medical image processing apparatus of claim 15, wherein the first attachable marker and the second attachable marker are attached to at least one among a nose, an ear, and a philtrum of the object.

18. A medical imaging system comprising:
a medical apparatus comprising a medical scanner which scans an object and acquires a scan signal; and
a medical image processing apparatus which is connected to the medical apparatus,
wherein the medical image processing apparatus comprises:
a processor which obtains first volume data in a first period acquired by scanning the object, which has a first attachable marker attached to a surface of the object and a landmark disposed within the object; and
a data processor configured to estimate a first plane of interest (POI), based on a position of the first attachable marker and a position of the landmark in the first volume data and acquire a first image of interest (IOI) which is an image of the first POI,
wherein, in a second time period, the processor obtains second volume data acquired by scanning the object with a second attachable marker attached to a same position as that of the first attachable marker in a scan in the first period, and the data processor estimates a second POI which is a same POI as the first POI, based on a position of the second attachable marker, a position of the landmark in the second volume data, and a positional relationship between the first attachable marker and the first POI, and acquires a second IOI which is an image of the second POI.

19. The medical imaging system of claim 18, wherein the medical scanner is configured to perform a scout scan of the object to acquire the scan signal.

20. The medical imaging system of claim 19, wherein the medical scanner is configured to rescan the object to acquire a rescan signal, to acquire a third IOI which is an image of the second POI estimated by the medical image processing apparatus.

21. The medical imaging system of claim 20, wherein the data processor is configured to acquire the third IOI based on the rescan signal, and
to output the acquired third IOI.

22. The medical imaging system of claim 18, wherein medical apparatus is a magnetic resonance imaging (MRI) apparatus.

23. The medical imaging system of claim 18, wherein the first attachable marker and the second attachable marker are attached to at least one among a nose, an ear, and a philtrum of the object.

* * * * *